(12) United States Patent
Davis et al.

(10) Patent No.: US 8,909,990 B2
(45) Date of Patent: Dec. 9, 2014

(54) HISTORICAL SOFTWARE DIAGNOSTICS USING LIGHTWEIGHT PROCESS SNAPSHOTS

(75) Inventors: Jackson Davis, Snohomish County, WA (US); Tae Hyung Kim, Redmond, WA (US); Colin A. Thomsen, Sammamish, WA (US); Steve Carroll, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 13/567,034

(22) Filed: Aug. 4, 2012

(65) Prior Publication Data

US 2014/0040669 A1 Feb. 6, 2014

(51) Int. Cl.
*G06F 11/00* (2006.01)

(52) U.S. Cl.
USPC .......................................... 714/37; 714/38.1

(58) Field of Classification Search
CPC ............ G06F 11/1458; G06F 11/1641; G06F 11/366; G06F 11/1415
USPC .............. 714/27, 37, 38.1; 717/124, 125, 126
See application file for complete search history.

(56) References Cited

U.S. PATENT DOCUMENTS

| | | | |
|---|---|---|---|
| 6,901,581 B1 | 5/2005 | Schneider | |
| 6,981,243 B1 | 12/2005 | Browning et al. | |
| 8,090,989 B2 * | 1/2012 | Law et al. | 714/35 |
| 2002/0087950 A1 * | 7/2002 | Brodeur et al. | 717/124 |
| 2008/0295077 A1 * | 11/2008 | Sengupta et al. | 717/124 |
| 2009/0307528 A1 | 12/2009 | Byers et al. | |
| 2012/0096441 A1 * | 4/2012 | Law et al. | 717/127 |

OTHER PUBLICATIONS

Sedlacek, Jiri, "Profiling With VisualVM, Part 1," The NetBeans Profiler and VisualVM Blog, (downloaded from: https://blogs.oracle.com/nbprofiler/entry/profiling_with_visualvm_part_1 on Apr. 20, 2012), Jul. 28, 2008, (8 pages).

Strein, Dennis et al., "Design and Implementation of a high-level multi-language .NET Debugger," The 3rd International Conference on .NET Technologies, 2005 (downloaded from: http://dotnet.zcu.cz/NET_2005/Papers%5CFull%5CA83-full.pdf), May 31, 2005, pp. 57-64.

(Continued)

*Primary Examiner* — Dieu-Minh Le
(74) *Attorney, Agent, or Firm* — Kevin Sullivan; Katherine Drakos; Micky Minhas

(57) ABSTRACT

A debugging and diagnostics system allows users to take lightweight process snapshots of running debuggee processes so the users may analyze those snapshots at a later time. The snapshot mechanism allows diagnostic tools to compare an original process or one or more process snapshots or to compare any of a series of snapshots to each other. The snapshot mechanism further allows users to inspect a snapshot of process memory while allowing the original process to continue running with minimal impact. A user may do historical debugging using process snapshots of a debuggee process taken over time. This allows the user to view the state of the debuggee process as it existed when the snapshot was taken. The lightweight process snapshot is less invasive because it does not require a full copy of the memory and allows the original process to run un-interrupted while specific collections and inspections are completed.

20 Claims, 5 Drawing Sheets

(56) References Cited

OTHER PUBLICATIONS

Unknown, "Collecting performance snapshots using vm-support," vmware® Knowledge Base, (downloaded from: http://kb.vmware.com/selfservice/microsites/search.do? cmd=displayKC&docType=kc&docTypedo= DT_KB_1_1 &externalId=1967 on Apr. 20, 2012), (date unknown), (1 page).

Unknown, "Details," Microsoft Knowledge Base, (downloaded from: http://www.microsoft.com/products/ee/transform.aspx?evtsrc=microsoft.reportingservices.diagnostics.utilities.errorstrings.resources.strings&evtid=rsreporthistorynotfound&prodname=sql%20server%20reporting%20services&prodver=8.00&lcid=1033 on Apr. 20, 2012), (date unknown), (1 page).

Avaya, "SCS 4.0 Diagnostics Task Based Guide," Document No. NN40010-528 Issue 1.3 SCS 4.0, 0(downloaded from: http://downloads.avaya.com/css/P8/documents/100122211 on Apr. 20, 2012), 2010, (53 pages).

"International Search Report & Written Opinion for PCT Patent Application No. PCT/US2013/053110", Mailed Date: Nov. 11, 2013, Filed Date: Aug. 1, 2013, 10 Pages.

Plank, et al., "Libckpt: Transparent Checkpointing under Unix", In Proceedings of the Usenix Winter Technical Conference, Jan. 16, 1995, 13 Pages.

Plank, et al., "Memory Exclusion: Optimizing the Performance of Checkpointing Systems", In Journal of Software: Practice and Experience, vol. 29, Issue 02, Feb. 1999, 15 Pages.

* cited by examiner

HISTORICAL SOFTWARE DIAGNOSTICS USING LIGHTWEIGHT PROCESS SNAPSHOTS

BACKGROUND

Traditional software diagnostic tools, such as debuggers, profilers, and memory diagnostic tools, typically operate on a live, running process or a saved, heavyweight process state, such as a process dump file or historical trace. Live processes provide little or no historical context about how a process reached its current state. Process dump files, while verbose, are extremely heavyweight and time consuming to create and analyze.

It is common for software developers to analyze historical data during the diagnostic process. For instance, while debugging, developers may want inspect the process as it existed in previous states instead of a current state. For memory diagnostics, developers often want to see changes in a process's memory over time.

In both production and development scenarios, it is important to non-invasively and non-disruptively collect diagnostic data. In production, the diagnostic tools should have little or no impact on the production process and system. The collection of process state data using existing solutions may affect the process and system in an undesirable manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A debugging and diagnostics system allows users to take lightweight process snapshots of live debuggee processes so the users may analyze those snapshots at a later time. The debugging and memory diagnostics system may be used in production scenarios because it minimizes disruption to the production system while still allowing the user to capture snapshots of process states. The lightweight process snapshots enable inspection of a process's callstacks, variable values, memory, module list, thread list and the like while allowing the original process to continue executing.

The snapshot mechanism allows diagnostic tools to compare an original process to one or more process snapshots or to compare any of a series of process snapshots to each other. The snapshot mechanism further allows users to inspect a snapshot of process memory while allowing the original process to continue running with minimal impact.

The term lightweight process snapshot or "snapshot" as used herein refers to a copy of a process that can be created efficiently without needing to create a full trace of the process's execution or memory. In a typical embodiment, an operating system implements the snapshot mechanism on top of a virtual memory model and uses shared memory pages and copy-on-write techniques to avoid the need to create a complete copy of the process. Copy-on-write allows the operating system to map the actual pages of the entire address space of the original process into a second process snapshot quickly.

If the original process executes after the snapshot, any memory writes by the original process will cause a copy of that memory page to be created. However, only the pages that are actually modified by the process execution will have copies created. Unmodified pages are shared between the original process and any process snapshots.

A memory diagnostics system allows the collection of process memory information by executing collection code in a process snapshot while allowing the original process to continue to run separately. The memory diagnostics system may collect target process memory information in an out-of-process manner with minimal disruption and memory overhead to the target process. A user may take two or more snapshots of a live debuggee process' memory and compare those snapshots for changes in memory usage over time.

Many process snapshots taken over time can be used together in a lighter way than using memory dumps if most of the snapshot's shared memory remains unchanged. With many snapshots over time, snapshot data can be compared to a baseline, or between snapshots. Additionally historical snapshots can be partial read to analyze trends over time.

A memory diagnostics system may apply data abstraction at collection time, which allows multiple collections to be cross-referenced. The system may dynamically and automatically adjust a snapshot collection rate based on historical collection data, which will minimize resource usage when using the process snapshots.

Using a process snapshot, memory overhead from in-process collection can be reduced by moving that collection to the snapshot process. For example, in the case of in-process components, memory is consumed by the process for which information is collected. That information may be stored in the snapshot of a target process. This will not affect the performance of the target process or potentially cause it to reach an out-of-memory condition due to the collection of diagnostic information. Accordingly, this technique greatly mitigates the chance of disrupting the original process.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
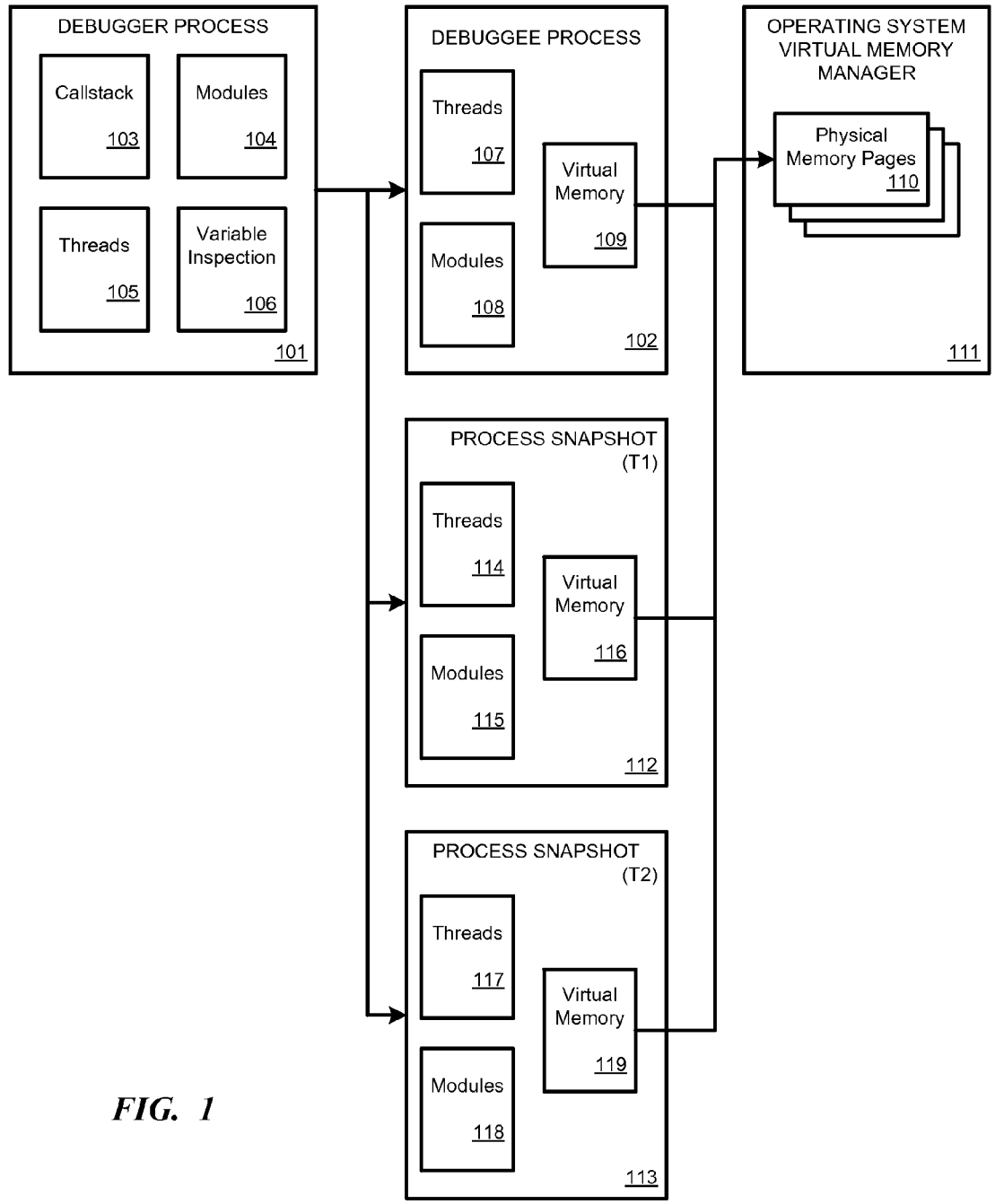
FIG. 1 illustrates historical debugging with lightweight process snapshots.

Lightweight process snapshots are created in cooperation with the operating system on which a target process is running. This allows the snapshot to be created much faster and using fewer system resources than requiring the diagnostic tool to generate the snapshot itself. In one embodiment, the operating system's memory mapping mechanism and copy-on-write are used to map in the address space of the target process to a new snapshot process. The process snapshot may be a clone of the executing process using page table duplication and copy-on-write operations. The process snapshot may be created in other ways, such as by reflecting over the target process or copying memory addresses of the target process.

If the original process is allowed to run, new copies of the memory pages are created as the process writes to each page. This may have some minimal impact to the original process's performance, but it has to create real pages only when one is actually written to.

In some embodiments, a process state may be duplicated by the diagnostic tool. For example, a process snapshot mechanism might not snapshot a module list or thread list, but the diagnostic tool can create snapshots of the module list or thread list quickly and without consuming resources in the way that copying the process heap or stack would require.

The lightweight process snapshot model enables a mode of historical debugging during a debug session. The snapshots of a debuggee process over time allow a user to view the state of the debuggee process as it existed at the time the snapshot was taken. The user may control when snapshots are taken or the debugger may take the snapshots automatically after some predefined trigger or event. The system's physical and logical resources are the only limit to the number of snapshots that can be created for a process at one time. This makes it possible for a debug session to have multiple snapshots present in the system at once.

In one embodiment, when a developer wishes to inspect the process in the state that existed at a particular time, the developer chooses the snapshot that corresponds to that time from a list of available snapshots. Once a snapshot is selected, it is used as the debugger's data source for inspection. In this mode, all debugger views, including, but not limited to, call-stacks, variable values, memory, module list, and thread list, are generated using the snapshot data—not the live process. This enables the developer to see the state of the process at the selected time.

Some states may not be inspectable using this model. For example, a snapshot might not be generated for a state in the kernel or other entities, such as files or pipes. However, with sufficient cooperation with the operating system, it is possible to extend this mechanism to snapshot more than just the process state and to include copies of these external entities.

Live process debuggers typically use memory read primitives and thread context primitives for data inspection. When the debugger needs to obtain the value of a particular piece of data, the debugger queries the symbolic information to determine where it resides in the debuggee process memory. This may require reading thread register state, for example. The debugger then reads the desired data from the process using functions such as the Win32® ReadProcessMemory and GetThreadContext functions. When the debugger switches to a process snapshot as the data source, reads are simply reads from the snapshot process.

FIG. 1 illustrates historical debugging with lightweight process snapshots. A debugger process 101 is used to debug the debuggee process 102. The debugger process 101 has a user interface that allows the user to analyze components of the debuggee process. For example, the user interface may provide windows showing callstack 103, modules 104, threads 105, and variable inspection 106. The debuggee process 102 comprises, for example, threads 107, modules 108, and a virtual memory page table 109. Virtual memory 109 points to physical memory pages 110 that are managed by the operating system's virtual memory manager 111.

During the debug session lightweight process snapshots 112 and 113 are created. These are snapshots of the debuggee process 102 taken at a specific time. The snapshots 112, 113 may be manually initiated by the user, or the debugger 101 may automatically generate the snapshots 112, 113 when a particular event or trigger is observed or at certain intervals.

Snapshot 112 comprises a thread table 114 and modules table 115, which are copies of debugger 101's internal tables at the time (T1) that snapshot 112 was created. Virtual memory page table 116 points to the physical memory pages 110 that were in use at time T1 when snapshot 112 was created. Initially, virtual memory 109 and virtual memory 116 will be identical; however, as debuggee process continues to run virtual memory 109 will change as its page table points to updated memory locations 110.

Similarly, at another time (T2), process snapshot 113 is created in response to a user selection or the occurrence of an event or trigger observed by the debugger process 101. Snapshot 113 includes copies of thread table 117 and modules table 118 at time T2 when the snapshot was created along with a copy of the then-current virtual memory page table 119.

Snapshots 112, 113 allow the debugger process 101 or the user to look back at what debuggee process 102 looked like at the time (T1, T2) when snapshots 112, 113 were created even though debuggee process 102 has changed in the meantime. Also, the debugger process can compare states between and among debuggee process 102 and/or process snapshots 112, 113 to generate differentials between the different process states at different times so that the user can see what part of the process has changed and how.

In other embodiments, a snapshot 112 may be created and the original debuggee process 102 may be allowed to run without interference. Tests may then be run against process snapshot 112 to observe how the process is affected. If process snapshot 112 fails or has other problems due to the tests, then those problems will not affect the real running process 102.

Figure 2:
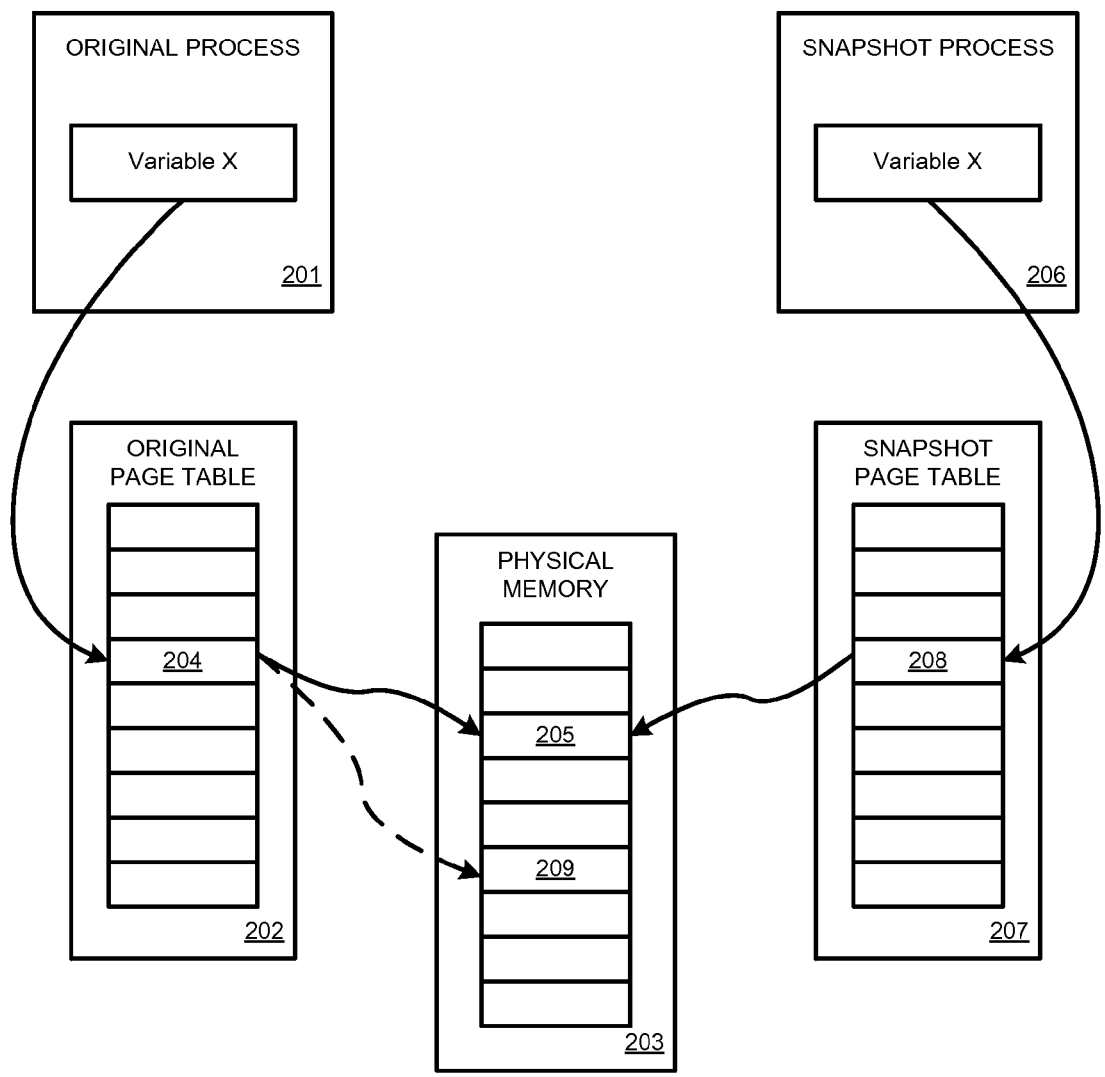
FIG. 2 illustrates a lightweight process snapshot according to one embodiment.

FIG. 2 illustrates a lightweight process snapshot according to one embodiment. Original process 201 includes a page table 202 that points to data stored in physical memory 203. For example, process 201 may store a variable X in page table entry 204, which points to a physical memory location 205 where the value for variable X is actually stored.

When process snapshot 206 is created from original process 201, original page table 202 is copied as snapshot page table 207. The content of snapshot page table 207 is the same as the content of original page table 202 as it existed at the time the snapshot was created. For example, in process snapshot 206, variable X points to an entry 208 in snapshot page table 207, which—like original page table 202—points to physical memory location 205 where the value for variable X is stored.

Original process 201 may continue to run after the snapshot is created. The original process may generate a new value for variable X, which is again stored in entry 204 of original page table 202. However, the new value for variable X is stored in physical memory 203 in a new location 209. Accordingly, original page table 202 is updated to point to physical memory location 209, but snapshot page table 207 maintains its snapshot state and points to memory location 205 where the original value of variable X still resides.

The snapshot mechanism allows for a less destructive debug inspection. Typically when in break mode while debugging a process, the debuggee process is halted by the operating system. This means code within the debuggee process does not execute. This is ideal for inspecting the debuggee state because that state cannot change while the process is halted. However, in some scenarios, halting the process can lead to dead-locks or other system instability. For example, when the debuggee process is shared among other processes, the other processes may attempt to communicate with the shared debuggee process while in break mode. This can lead to delays in other processes in the best case and deadlocks, process corruption, and instability in the worst case. The lightweight snapshot model enables debugging in such scenarios by allowing the debugger to inspect a lightweight process snapshot of the shared process rather than the real process. The real process is allowed to continue execution during this inspection.

For example, in the Windows Runtime (WinRT) model in Windows 8, each application is made up of at least two processes: one process where the user code is executed and another broker process where security sensitive objects live. The brokered objects are part of the system and not user code. Therefore, inspection is the only aspect of debugging that is required. Given that these objects are logically part of the debuggee, but live in a separate broker process, the developer may want to inspect such objects. However, the broker process is shared among many applications, and halting the broker process would deadlock all other applications. Accordingly, using lightweight process snapshots to create a copy of the broker process at a specific time would allow the developer to inspect against that process, while still allowing the broker to handle calls from other processes.

The lightweight process snapshot also provides minimally disruptive memory data collection. In production scenarios, memory diagnostics tools are typically memory-dump or snapshot based, which is preferred as this does not disrupt the target process. Other, non-dump based memory tools, such as memory profilers, often execute code in the target process. This adds a significant risk to the health and performance of the target process. Additionally this is disruptive to the target process while the collection routines execute. Memory-dump based diagnostics are resource intensive and often do not provide detailed data that is available from profilers.

A lightweight process snapshot approach provides a non-disruptive method of collecting the memory data and includes a number of benefits found in memory profilers. A snapshot of the target process is taken and the snapshot is used for inspection similar to debug inspection as noted above. Additionally, collection routines may be executed in the process snapshot while allowing the original process to continue.

In production scenarios, diagnostic tools should have minimal impact on the target process in areas such as performance, memory utilization and risk of functional disruption. In development scenarios, while is it still important to minimize overhead in these areas, the focus is ensuring the quality of the diagnostics data. The process snapshot approach provides minimal target process disruption while creating the snapshot. Additional overhead generated after the snapshot is created only applies to the snapshot not the original process. The diagnostic tool may then run disruptive collection and analysis against the snapshot, providing richer data in a more efficient manner. If these diagnostic routines cause significant performance degradation in the snapshot process, cause the process snapshot to hit its memory ceiling, or even terminate the snapshot process, then the original process will still continue to run. Because only the process snapshot is affected, this greatly reduces the risk profile of data collection to the target process.

Figure 3:
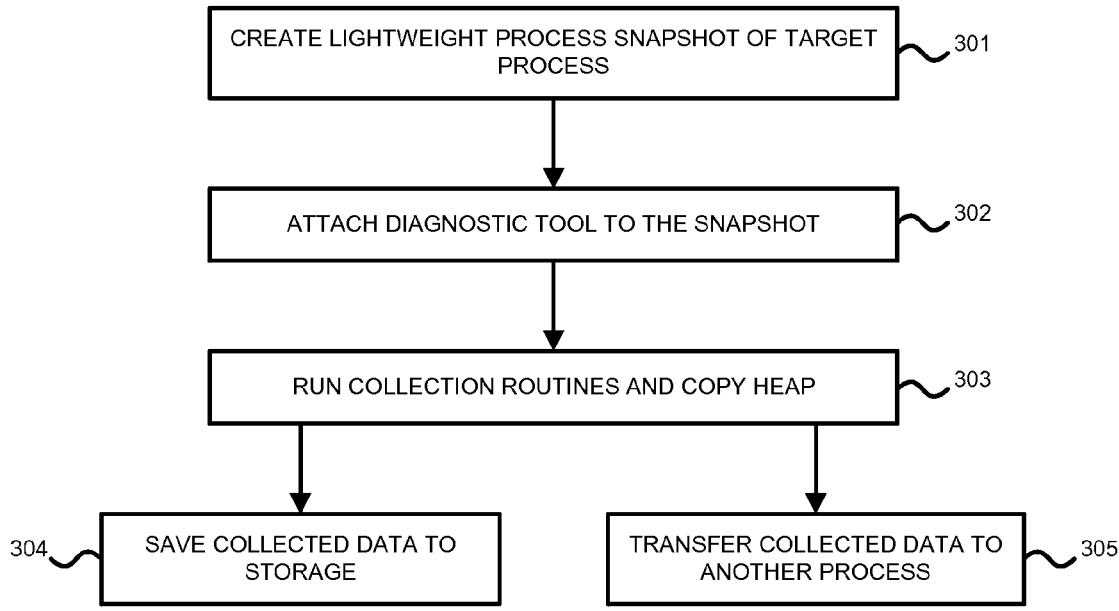
FIG. 3 is a flowchart illustrating a method for in-process collection scenario.

FIG. 3 is a flowchart illustrating a method for in-process collection scenario. In step 301, a lightweight process snapshot is taken of the target process. In step 302, a diagnostic tool is attached to the process snapshot. In the meantime, the original process continues to run without interruption. In step 303, collection routines are run against the snapshot process. The collection routines may include, for example a forced garbage collection. The heap list is also retrieved. In step 304, the collected data is saved to storage where it will be available for later analysis and review. Additionally, or alternatively, in step 305, the collected data is transferred by inter-process communication (IPC) to another process. The collection routines are not run on the original process in this scenario. This allows the diagnostic tool to minimize any risk of disrupting the original process.

The lightweight process snapshot approach also supports on-demand collection and inspection of data. Existing memory diagnostic approaches require a memory-dump or trace to be collected for the entire process at the time of the dump. This can be resource intensive and provides redundant information. Memory profilers and instrumentation are used to collect all of the required data and then save that data at the time of collection. Generally, this occurs in-process.

The light weight process snapshot approach has the ability collect, save, and read partial data in the process snapshot on-demand as the tool or user require it. This has the advantage of being more resource efficient and allows for richer user-driven diagnostic scenarios.

Figure 4:
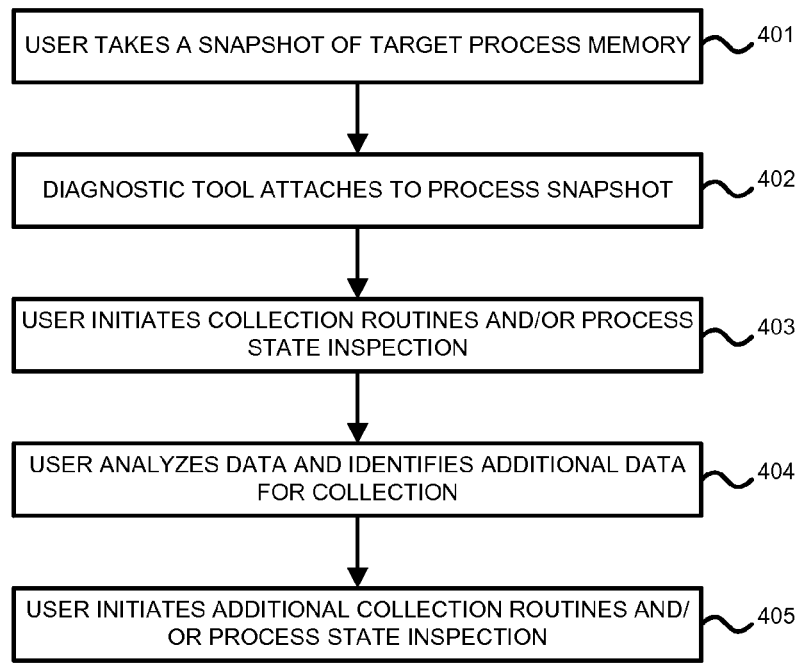
FIG. 4 is a flowchart illustrating a method of user-driven diagnostic collection according to one embodiment.

FIG. 4 is a flowchart illustrating a method of user-driven diagnostic collection according to one embodiment. In step 401, the user takes a snapshot of target process's memory. In step 402, the user attaches a diagnostic tool to the process snapshot. The original process continues to run without interference. In step 403, the user initiates collection routines and/or user initiates process state inspection, such as heap object inspection. The user analyzes the data and identifies additional required data and/or more specific data in step 404. The user then initiates additional collection routines and/or user initiates process state inspection in step 405.

It will be understood that steps 301-305 of the process illustrated in FIG. 3 and steps 401-405 of the process illustrated in FIG. 4 may be executed simultaneously and/or sequentially. It will be further understood that each step may be performed in any order and may be performed once or repetitiously.

The lightweight process snapshot model supports both in-process and out-of-process collection and inspection. In-process collection routines dramatically increase the risk of disrupting the target process. Therefore, if the collection routine is run in the non-critical process snapshot—rather than the original target process—then the risk to the original process is mitigated. Traditionally out-of-process collection and inspection also minimizes process disruption. However, out-of-process collection has the downside of blocking the target process during collection. Using a process snapshot, the original process can continue to run, while the out-of-process collection is run on the snapshot process.

The lightweight process snapshot model allows users to analyze historical memory usage. Existing memory-dump or state-snapshot based diagnostic approaches are limited snapshots of points in time and require the user to manually correlate data between multiple snapshots. Using the lightweight process snapshot based approach described herein, additional abstraction of the data can be performed at collection time. This allows for richer diagnostic cross-referencing and correlation at analysis time.

An in-process memory profiler has the advantage that it is collecting against the actual process memory while collection routines execute. However, in the lightweight process snapshot approach, the snapshot memory is mapped. Therefore, especially when comparing multiple snapshots over time, memory information in the snapshot could have changed and thus become irrelevant when comparing snapshots.

For example, object pointers may change between snapshots. A specific memory diagnostic abstraction to solve this problem would be to uniquely tag each object with an identifier that allows it to be tracked over multiple snapshots. A scenario where this may happen is analyzing garbage collector (GC) heaps where two or more snapshots would be taken on GC-collected heaps against the target process. An abstraction applied at the time of collection to uniquely identify each heap object would allow the comparison of multiple heap snapshots over time. This provides greatly improved diagnostic information over existing dump-based approaches because it allows the diagnostic tool to automatically correlate data between collections and provide a diff or comparison view of the data to show what changed between snapshots. These diffs could be between a baseline snapshot and one or more following snapshots: multiple-baselines, multiple following snapshots, or data over multiple snapshots.

Lightweight process snapshots may be used for heap comparison as described in the following example. A process snapshot (process snapshot #1) is taken of a target process. Process snapshot #1 provides a baseline for the target process. A diagnostic tool attaches to process snapshot #1, and the original process continues to run. The diagnostic tool forces a garbage collection and then walks the heap to make sure that the heap is properly allocated, in a consistent state, and not corrupt. The diagnostic tool performs an abstraction of the heap objects to track them.

When some action in the target process changes the heap, another process snapshot (process snapshot #2) is taken of target process. The diagnostic tool attaches to process snapshot #2, and the original process continues to run. The diagnostic tool forces a garbage collection. This causes an object that existed in process snapshot #1 to move and, therefore, causes its object pointer to change. The diagnostic tool then walks the heap.

The diagnostic tool then performs an abstraction of the heap objects to track them. A diff of the two snapshot heaps may be performed, including comparisons of objects that were moved and have different object pointers between snapshots.

These steps can be repeated whenever some action in the target process changes the heap. Multiple snapshots may be compared to the original baseline, or any following snapshot may be compared to any preceding snapshot.

An example of analyzing data over multiple snapshots is described next. A process snapshot is taken of a target process. A diagnostic tool attaches to the snapshot process, and the original process continues to run. Data of interest is collected from the snapshot process. Additional snapshots of the target process are taken and data is collected. Historical data from different snapshots is analyzed and presented over time to identify trends.

While the diagnostic tool collects data from the snapshot process, disruption to the original process is minimized. This allows a large number of snapshots to be taken over time to collect specific and abstracted data (as opposed to collecting the entire memory-dump), and allowing trends to be determined easily. Lightweight process snapshots that create additional diagnostic abstractions provide richer comparisons than traditional dump-based memory diagnostic tools. Using process snapshots in both debugging and memory diagnostic scenarios significantly reduces the possible risk to the original process. Additionally, with on-demand inspection coupled with copy-on-write virtual memory, process snapshots minimize resource requirements for the overall system.

Additionally because the process snapshots only copy memory on write, considerably more process snapshots may be taken than full memory dumps over a shorter time. This enables scenarios that can dynamically and automatically adjust collection rates based on historical collection data that was collected intervals. When a potential issue is detected using historical analysis, the tool can automatically adjust the type of data that is collected in future snapshots.

The following algorithms can be used with the lightweight process snapshots.

Historical Debugging.

A debugger that supports historical debugging with lightweight process snapshots provides manual and/or automatic means by which snapshots are created. For example, a debugger may expose a user action to create a new snapshot, or a snapshot may be automatically generated when an interesting event occurs, such as when a breakpoint is hit or a step is complete.

To create the snapshot, the debugger temporarily suspends the live process to ensure stability. The debugger then records any state not transferred into the snapshot, such as the threads and modules lists. Finally, the debugger asks the operating system to create the snapshot. The operating system clones the process, memory maps the virtual memory into the snapshot, and enables copy-on-write. The debugger then resumes the original process.

At a later point in time, when the user decides to view historical data, he or she uses a user interface provided by the debugger to make a snapshot of the current debugger context. The debugger then uses the current lightweight process snapshot as its data source for all debugger data views. For example, when evaluating a variable's value, the memory is read from the snapshot, not the live process. Previously stored process snapshots may also be viewed or accessed by the user. It is also possible that a user may choose to switch to a different historical snapshot taken at a different time. When the user is finished inspecting the historical state, the debugger switches its data source back to the live process.

The number of lightweight process snapshots available to the user is restricted by only system resources and operating system limitations. However, a debugger that supports such a model will typically provide a user interface to allow the user to discard some snapshots when no longer needed.

Less Destructive Debug Inspection.

The less destructive debugger inspection model may be used in a scenario where a debugger wants to inspect the state of a process while allowing that process to continue to execute. This capability is critical for scenarios where the debuggee process may be shared by multiple clients and suspending the process for inspection would block all other clients.

To create the snapshot, the debugger temporarily suspends the live debuggee process to ensure stability, records any state not transferred into the snapshot, such as the threads and modules lists, and then asks the operating system to create the snapshot. The operating system then clones the process, memory maps the virtual memory into the snapshot, and enables copy-on-write. The debugger then resumes the original process to allow it to handle requests from other clients.

The debugger uses the current lightweight process snapshot as its data source for all debugger data views. For instance, when evaluating a variable's value, the memory is read from the snapshot, not the live process. When the primary debuggee process is allowed to execute by leaving break state, the snapshot is discarded and inspection against it is disallowed. When the primary debuggee process once again enters break mode, a new current snapshot of the shared process is created and inspected against as described above.

Figure 5:
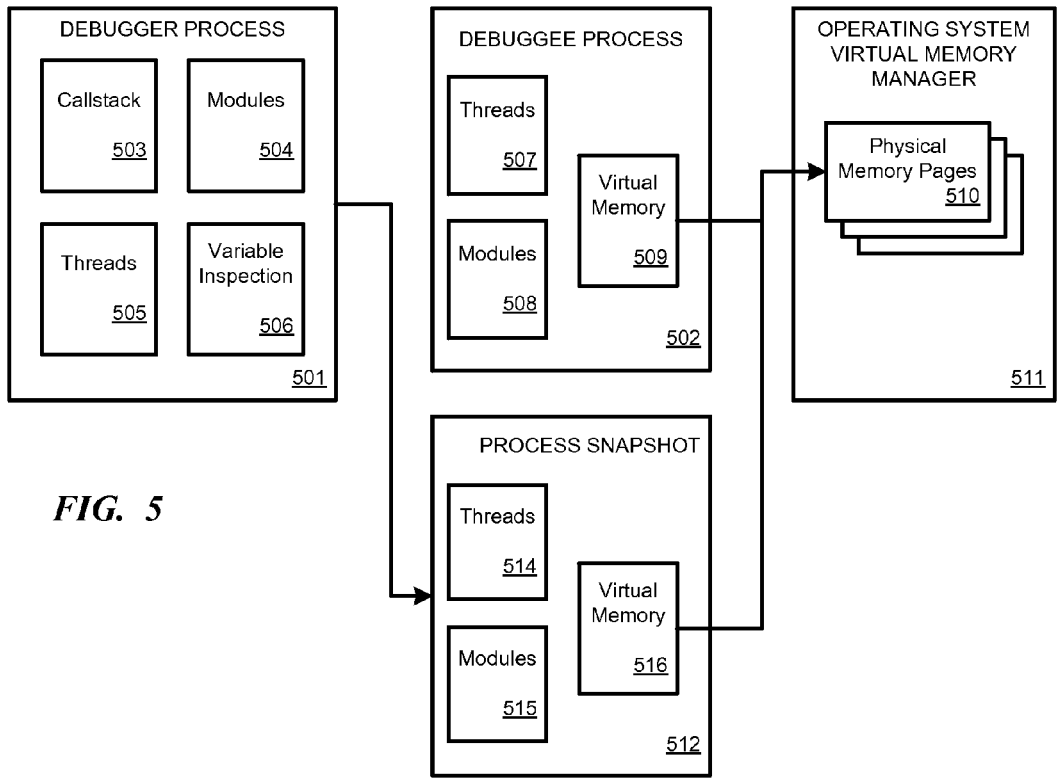
FIG. 5 illustrates less invasive debugging by inspecting against a lightweight process snapshot while allowing the real debuggee process to continue running.

FIG. 5 illustrates less invasive debugging by inspecting against a lightweight process snapshot while allowing the real debuggee process to continue running A debugger process 501 is used to debug the debuggee process 502. The debugger process 501 has a user interface that allows the user to analyze components of the debuggee process. For example, the user interface may provide windows showing callstack 503, modules 504, threads 505, and variable inspection 506. The debuggee process 502 comprises, for example, threads 507, modules 508, and a virtual memory page table 509. Virtual memory 509 points to physical memory pages 510 that are managed by the operating system's virtual memory manager 511.

Instead of attaching to debuggee process 502, a lightweight process snapshot 512 is created. Snapshot 512 comprises a thread table 514 and modules table 515, which are copies of the thread and module lists on debuggee process 502 when snapshot 512 was created. Virtual memory page table 516 points to the physical memory pages 510 in use when snapshot 512 is created. Initially, virtual memory 509 and virtual memory 516 will be identical.

The debugger process 501 inspects snapshot 512 while allowing debuggee process 502 to run without interference. Tests may then be run against process snapshot 512 to observe how the process is affected. If process snapshot 512 fails or has other problems due to the tests, then those problems will not affect the real running process 502.

On-Demand Memory Data Collection and Inspection.

Entire memory dumps can be very large. On-demand data collection across multiple snapshots can reduce the resource requirements of data collection and inspection significantly.

The diagnostic tool first attaches or enables/activates any components required for collection on the target process. This might include a garbage collection for example. The operating system clones the original process, memory maps the virtual memory into the snapshot, and enables copy-on-write. These steps may be repeated a number of times, during which the target process would continue to run, and allow interaction.

The diagnostics tool can run on-demand collection against the snapshots any time after they are created. For example, the user might query two snapshots for instances of an object while the target process continues to run. If the diagnostics tool determines that a specific instance of the object is interesting, a drill down into a member of the object is required. An additional on-demand read of the memory from that specific instance is collected against the snapshot and inspected.

This process could be repeated any number of times, while still allowing the original target process to run un-interrupted while targeted, specific collections and inspections are completed.

Figure 6:
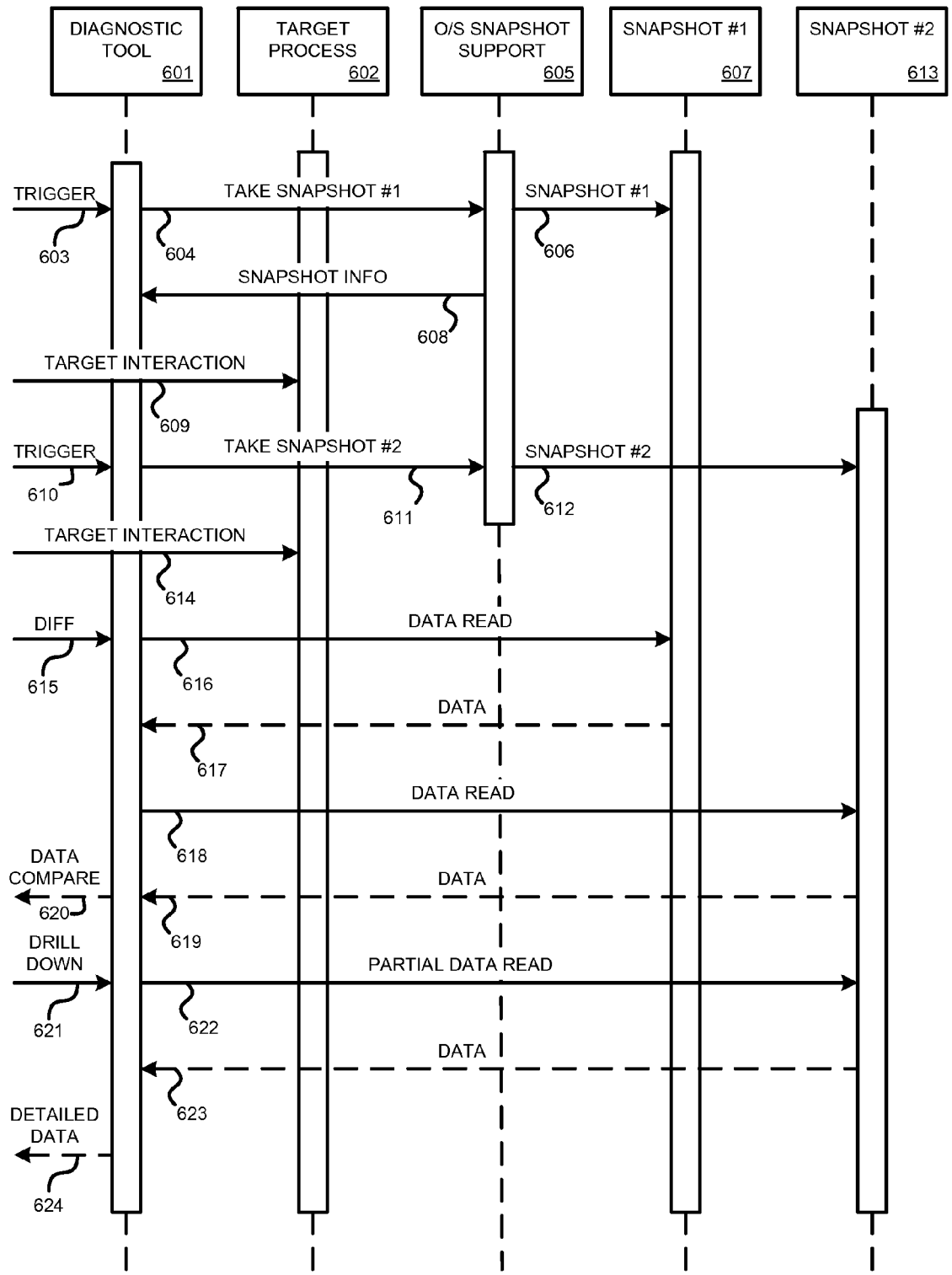
FIG. 6 illustrates an on demand memory data collection and inspection embodiment.

FIG. 6 illustrates an on demand memory data collection and inspection embodiment. This embodiment demonstrates on-demand partial inspection of data while the target process continues to run. The diagnostic tool can continue to interact with the target process with during inspection.

Diagnostic tool 601 is attached to target process 602. A triggering event 603 is observed, and diagnostic tool 601 then instructs (604) the operating system (0/S) snapshot support 605 to take a snapshot of target process 602. The triggering event may be, for example, a user request, a predetermined time, a predetermined interval, hitting a breakpoint or exception, completing a step, observation of an interesting state of the target process, or the like. Operating system snapshot support 605 generates (606) a first lightweight process snapshot 607. Operating system snapshot support 605 returns snapshot data (608) to diagnostic tool 601.

The diagnostic tool 601 continues to interact (609) with the target process 602. When another triggering event 610 occurs, diagnostic tool 601 instructs (611) Operating system snapshot support 605 to take another snapshot of target process 602. Operating system snapshot support 605 generates (612) a second lightweight process snapshot 613.

The diagnostic tool 601 continues to interact (614) with the target process 602. At a later time, the user instructs (615) the diagnostic tool to generate a diff between the two snapshots. Diagnostic tool 601 does a data read (616) on process snapshot 607 and receives the requested data (617). Then, diagnostic tool 601 does a data read (618) on process snapshot 613 and receives the requested data (619). Diagnostic tool 601 does a compare of the data received from the process snapshots and provides a data comparison or diff (620) to the user.

The user may also instruct the diagnostic tool 601 to drill down (621) into one of the snapshot processes. Diagnostic tool 601 does a partial data read (622) on the data of interest in process snapshot 613 and receives the requested data (623). The detailed data (624) from the drill-down is then presented to the user.

In-Process and Out-Of-Process Collection.

There are several disadvantages with in-process collection, including adding additional reliability risk to the process and consuming process resources, such as virtual memory or CPU time. Process snapshots allow the diagnostic tool to transfer some of these disadvantages to the snapshot. The operating system clones the process, memory maps the virtual memory into the snapshot, and enables copy-on-write. This may be repeated multiple times after suspending the process to allow several "identical" snapshots to be created. The diagnostic tool then injects or activates collection components in the process snapshot while the original process continues to run.

Different collection pieces can be used against multiple snapshots taken at the same time to allow collection scenarios that might have otherwise been impossible against a single process. The process snapshot might suffer or even die from the additional resources utilized by the collection process. In this case, the process snapshot can be killed if it is still operating and another snapshot created. The new snapshot may use less intensive resource requirements, such as a more targeted partial read. Data can be transferred out of the process using slower methods, such as writing to persistent or network storage, without affecting the original process.

Dynamic and Automatic Collection.

The diagnostic tool may be set to monitor a process of interest, with parameters for initial collection interval, interesting metrics, etc. The operating system clones the process, memory maps the virtual memory into the snapshot and enables copy-on-write. The diagnostic tool utilizes on-demand inspection to automatically analyze multiple process snapshots, to determine if there is an issue. When the number of process snapshots hits a predetermined limit, the oldest snapshots are killed. These steps may be repeated at a predetermined interval, such as every ten minutes.

When an issue is detected, the tool dynamically adjusts what is collected. For example, if the tool detects instances of an object were not being closed, then the tool adjusts the collection interval to a shorter time and uses on-demand collection to collect detailed data about instances and relationships of the object.

The data and basic analysis might be transferred off system to reduce disruption to the system. The data and basic analysis can be used to determine the root cause of the issue.

Figure 7:
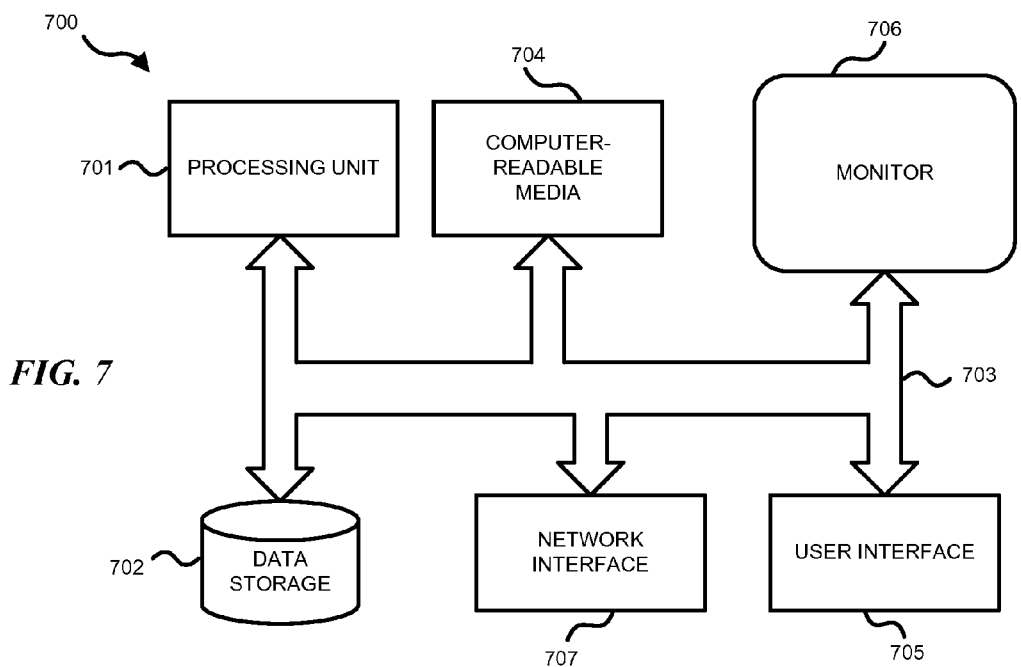
FIG. 7 illustrates an example of a suitable computing and networking environment on which the lightweight process snapshot embodiments may be implemented.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, various hardware components, such as processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 700 typically includes a variety of computer-readable media 704. Computer-readable media 704 may be any available media that can be accessed by the computer 700 and includes both volatile and nonvolatile media, and removable and non-removable media, but excludes propagated signals. By way of example, and not limitation, computer-readable media 704 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM. RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

A user may enter commands and information through a user interface 705 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 701 through a user input interface 705 that is coupled to the system bus 703, but may be connected by other interface and bus structures, such as a parallel port, game port or a universal serial bus (USB). A monitor 706 or other type of display device is also connected to the system bus 703 via an interface, such as a video interface. The monitor 706 may also be integrated with a touch-screen panel or the like. Note that the monitor and/or touch screen panel can be physically coupled to a housing in which the computing device 700 is incorporated, such as in a tablet-type personal computer. In addition, computers such as the computing device 700 may also include other peripheral output devices such as speakers and printer, which may be connected through an output peripheral interface or the like.

The computer 700 may operate in a networked or cloud-computing environment using logical connections 707 to one or more remote devices, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 700 may be connected to a public or private network through a network interface or adapter 707. In some embodiments, a modem or other means for establishing communications over the network. The modem, which may be internal or external, may be connected to the system bus 703 via the network interface 707 or other appropriate mechanism. A wireless networking component such as comprising an interface and antenna may be coupled through a suitable device such as an access point or peer computer to a network. In a networked environment, program modules depicted relative to the computer 700, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. In a computing environment, a method of analyzing an executing process, the method comprising:
   generating a process snapshot from the executing process, with the process snapshot and executing process allowed to run independently;
   associating a diagnostic tool with the snapshot process; and
   collecting data from the process snapshot using the diagnostic tool without affecting the executing process.

2. The computer-implemented method of claim 1, the process snapshot comprising a clone of the executing process using page table duplication and copy-on-write operations.

3. The computer-implemented method of claim 1, further comprising:
   generating one or more additional process snapshots from the executing process; and
   comparing data from any of the process snapshots to identify changes in memory usage over time.

4. The computer-implemented method of claim 3, further comprising:
   adjusting when the one or more additional process snapshots are generated based upon historical collection data.

5. The computer-implemented method of claim 3, further comprising:
   associating the diagnostic tool with at least one of the additional snapshot process; and
   collecting data from at least one additional process snapshot using the diagnostic tool.

6. The computer-implemented method of claim 1, further comprising:
   inspecting a memory of the process snapshot while allowing the executing process to run.

7. The computer-implemented method of claim 1, wherein the process snapshot is generated when a trigger event occurs.

8. The computer-implemented method of claim 1, further comprising:
   suspending the executing process while creating the snapshot process.

9. In a computing environment, a computer system including functionality for debugging an executing process, the computer system comprising: one or more processors; one or more computer readable media; one or more computer modules implemented as computer executable instructions stored on the computer readable media, that when executed by one or more processors, cause the processors to perform the following:
   generating a process snapshot from the executing process, the process snapshot comprising a clone of the executing process, the process snapshot and executing process allowed to run independently;
   associating a diagnostic tool with the snapshot process; and
   collecting data from the process snapshot using the diagnostic tool without affecting the executing process.

10. The computer system of claim 9, wherein the process snapshot comprising a clone of the executing process uses page table duplication and copy-on-write operations.

11. The computer system of claim 9, further comprising:
    generating one or more additional process snapshots from the executing process; and
    comparing data from any of the process snapshots to identify changes in memory usage over time.

12. The computer system of claim 11, further comprising:
    adjusting when the one or more additional process snapshots are generated based upon historical collection data.

13. The computer system of claim 11, further comprising:
    associating the diagnostic tool with at least one of the additional snapshot process; and
    collecting data from the at least one additional process snapshot using the diagnostic tool.

14. The computer system of claim 9, further comprising:
    inspecting a memory of the process snapshot while allowing the executing process to run.

15. The computer system of claim 9, wherein the process snapshot is generated when a trigger event occurs.

16. The computer system of claim 9, further comprising:
    suspending the executing process while creating the snapshot process.

17. In a computing environment, a computer readable medium comprising computer executable instructions that when executed by one or more processor cause the one or more processor to perform the following:
    generating a process snapshot from the executing process, the process snapshot comprising a clone of the executing process, the process snapshot and executing process allowed to run independently;
    associating a diagnostic tool with the snapshot process; and
    collecting data from the process snapshot using the diagnostic tool without affecting the executing process.

18. The computer readable medium of claim 17, further comprising:
    generating one or more additional process snapshots from the executing process; and
    comparing data from any of the process snapshots to identify changes in memory usage over time.

19. The computer readable medium of claim 17, further comprising:

adjusting when the one or more additional process snapshots are generated based upon historical collection data.

20. The computer readable medium of claim 17, further comprising:
inspecting a memory of the process snapshot while allowing the executing process to run.

* * * * *